(12) United States Patent
Livingood

(10) Patent No.: US 9,055,550 B1
(45) Date of Patent: *Jun. 9, 2015

(54) LOCATING A VOICE OVER PACKET (VOP) DEVICE CONNECTED TO A NETWORK

(71) Applicant: Comcast Cable Holdings, LLC, Philadelphia, PA (US)

(72) Inventor: Jason D. Livingood, Philadelphia, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,203

(22) Filed: Mar. 6, 2015

Related U.S. Application Data

(63) Continuation of application No. 14/224,785, filed on Mar. 25, 2014, which is a continuation of application No. 13/012,959, filed on Jan. 25, 2011, now Pat. No. 8,724,522, which is a continuation of application No. 10/924,485, filed on Aug. 24, 2004, now Pat. No. 7,940,746.

(51) Int. Cl.
*H04M 7/00* (2006.01)
*H04W 64/00* (2009.01)

(52) U.S. Cl.
CPC .................. *H04W 64/003* (2013.01)

(58) Field of Classification Search
CPC ....... H04L 41/12; H04L 41/22; H04M 7/006; H04M 2242/04
USPC .......... 348/14.01; 370/259, 352, 331; 379/37, 379/45; 455/445, 411, 412.2; 709/206
See application file for complete search history.

(56) References Cited

U.S. PATENT DOCUMENTS

| | | | |
|---|---|---|---|
| 4,456,925 A | 6/1984 | Skerlos et al. |
| 4,620,289 A | 10/1986 | Chauvel |
| 4,725,694 A | 2/1988 | Auer et al. |
| 4,878,048 A | 10/1989 | Gottesman et al. |
| 4,916,441 A | 4/1990 | Gombrich |
| 4,922,529 A | 5/1990 | Kiel |
| 4,995,074 A | 2/1991 | Goldman et al. |
| 5,014,267 A | 5/1991 | Tompkins et al. |
| 5,157,717 A | 10/1992 | Hitchcock |

(Continued)

FOREIGN PATENT DOCUMENTS

| | | |
|---|---|---|
| AU | 199859680 | 9/1998 |
| EP | 0758175 A1 | 2/1997 |

(Continued)

OTHER PUBLICATIONS

Bodamer, Charging in Multi-Service Networks, University of Stuttgart, 16 pages, Nov. 12, 1998.

(Continued)

*Primary Examiner* — Gerald Gauthier
(74) *Attorney, Agent, or Firm* — Banner & Witcoff, Ltd.

(57) ABSTRACT

Methods and systems are described for determining a physical address for a device connected to a network via a network access point. Associations between one or more physical addresses and network access points may be stored in a profile associated with the device. If the device is connected to a particular network access point, the profile and associations may be used to determine a current physical address for the device.

30 Claims, 1 Drawing Sheet

(56) References Cited

U.S. PATENT DOCUMENTS

| | | |
|---|---|---|
| 5,187,710 A | 2/1993 | Chau et al. |
| 5,253,341 A | 10/1993 | Rozmanith et al. |
| 5,274,700 A | 12/1993 | Gechter et al. |
| 5,276,731 A | 1/1994 | Arbel et al. |
| 5,301,050 A | 4/1994 | Czerwiec et al. |
| 5,335,276 A | 8/1994 | Thompson et al. |
| 5,341,425 A | 8/1994 | Wasilewski et al. |
| 5,349,638 A | 9/1994 | Pitroda et al. |
| 5,363,431 A | 11/1994 | Schull et al. |
| 5,375,161 A | 12/1994 | Fuller et al. |
| 5,393,964 A | 2/1995 | Hamilton et al. |
| 5,406,557 A | 4/1995 | Baudoin |
| 5,406,564 A | 4/1995 | Okita |
| 5,406,615 A | 4/1995 | Miller, II et al. |
| 5,428,608 A | 6/1995 | Freeman et al. |
| 5,449,970 A | 9/1995 | Kumar et al. |
| 5,479,411 A | 12/1995 | Klein |
| 5,483,588 A | 1/1996 | Eaton et al. |
| 5,488,412 A | 1/1996 | Majeti et al. |
| 5,512,935 A | 4/1996 | Majeti et al. |
| 5,533,110 A | 7/1996 | Pinard et al. |
| 5,534,913 A | 7/1996 | Majeti et al. |
| 5,537,157 A | 7/1996 | Washino et al. |
| 5,546,316 A | 8/1996 | Buckley et al. |
| 5,546,447 A | 8/1996 | Skarbo et al. |
| 5,559,800 A | 9/1996 | Mousseau et al. |
| 5,561,604 A | 10/1996 | Buckley et al. |
| 5,572,005 A | 11/1996 | Hamilton et al. |
| 5,583,965 A | 12/1996 | Douma et al. |
| 5,584,054 A | 12/1996 | Tyneski et al. |
| 5,587,735 A | 12/1996 | Ishida et al. |
| 5,592,529 A | 1/1997 | Linsker |
| 5,610,910 A | 3/1997 | Focsaneanu et al. |
| 5,612,997 A | 3/1997 | Vallelonga, Sr. et al. |
| 5,615,252 A | 3/1997 | Sizer, II et al. |
| 5,619,684 A | 4/1997 | Goodwin et al. |
| 5,628,005 A | 5/1997 | Hurvig |
| 5,629,978 A | 5/1997 | Blumhardt et al. |
| 5,642,348 A | 6/1997 | Barzegar et al. |
| 5,644,628 A | 7/1997 | Schwarzer et al. |
| 5,652,789 A | 7/1997 | Miner et al. |
| 5,671,267 A | 9/1997 | August et al. |
| 5,682,195 A | 10/1997 | Hendricks et al. |
| 5,684,918 A | 11/1997 | Abecassis |
| 5,689,501 A | 11/1997 | Takase et al. |
| 5,689,553 A | 11/1997 | Ahuja et al. |
| 5,689,555 A | 11/1997 | Sonnenberg |
| 5,696,815 A | 12/1997 | Smyk |
| 5,706,342 A | 1/1998 | Baeder et al. |
| 5,708,961 A | 1/1998 | Hylton et al. |
| 5,712,907 A | 1/1998 | Wegner et al. |
| 5,724,355 A | 3/1998 | Bruno et al. |
| 5,724,411 A | 3/1998 | Eisdorfer et al. |
| 5,724,412 A | 3/1998 | Srinivasan |
| 5,737,333 A | 4/1998 | Civanlar et al. |
| 5,740,230 A | 4/1998 | Vaudreuil |
| 5,740,231 A | 4/1998 | Cohn et al. |
| 5,742,596 A | 4/1998 | Baratz et al. |
| 5,742,905 A | 4/1998 | Pepe et al. |
| 5,745,556 A | 4/1998 | Ronen |
| 5,751,706 A | 5/1998 | Land et al. |
| 5,751,760 A | 5/1998 | Fuller et al. |
| 5,754,775 A | 5/1998 | Adamson et al. |
| 5,764,752 A | 6/1998 | Waite et al. |
| 5,768,513 A | 6/1998 | Kuthyar et al. |
| 5,778,173 A | 7/1998 | Apte |
| 5,784,444 A | 7/1998 | Snyder et al. |
| 5,790,806 A | 8/1998 | Koperda |
| 5,793,413 A | 8/1998 | Hylton et al. |
| 5,796,394 A | 8/1998 | Wicks et al. |
| 5,796,424 A | 8/1998 | Ely et al. |
| 5,796,718 A | 8/1998 | Caterisano |
| 5,796,952 A | 8/1998 | Davis et al. |
| 5,802,045 A | 9/1998 | Kos et al. |
| 5,802,160 A | 9/1998 | Kugell et al. |
| 5,802,510 A | 9/1998 | Jones |
| 5,805,587 A | 9/1998 | Norris et al. |
| 5,809,128 A | 9/1998 | McMullin |
| 5,812,786 A | 9/1998 | Seazholtz et al. |
| 5,825,829 A | 10/1998 | Borazjani et al. |
| 5,825,862 A | 10/1998 | Voit et al. |
| 5,832,221 A | 11/1998 | Jones |
| 5,850,340 A | 12/1998 | York |
| 5,850,429 A | 12/1998 | Joyce et al. |
| 5,859,895 A | 1/1999 | Pomp et al. |
| 5,859,902 A | 1/1999 | Freedman |
| 5,867,495 A | 2/1999 | Elliott et al. |
| 5,870,565 A | 2/1999 | Glitho |
| 5,883,677 A | 3/1999 | Hofmann |
| 5,883,942 A | 3/1999 | Lim et al. |
| 5,887,259 A | 3/1999 | Zicker et al. |
| 5,894,504 A | 4/1999 | Alfred et al. |
| 5,896,444 A | 4/1999 | Perlman et al. |
| 5,898,668 A | 4/1999 | Shaffer |
| 5,898,780 A | 4/1999 | Liu et al. |
| 5,907,547 A | 5/1999 | Foladare et al. |
| 5,907,598 A | 5/1999 | Mandalia et al. |
| 5,907,604 A | 5/1999 | Hsu |
| 5,912,952 A | 6/1999 | Brendzel |
| 5,912,962 A | 6/1999 | Bosco |
| 5,916,302 A | 6/1999 | Dunn et al. |
| 5,917,624 A | 6/1999 | Wagner |
| 5,920,705 A | 7/1999 | Lyon et al. |
| 5,923,731 A | 7/1999 | McClure |
| 5,928,335 A | 7/1999 | Morita |
| 5,930,340 A | 7/1999 | Bell |
| 5,944,795 A | 8/1999 | Civanlar |
| 5,946,381 A | 8/1999 | Danne et al. |
| 5,946,386 A | 8/1999 | Rogers et al. |
| 5,956,717 A | 9/1999 | Kraay et al. |
| 5,970,072 A | 10/1999 | Gammenthaler, Jr. et al. |
| 5,970,473 A | 10/1999 | Gerszberg et al. |
| 5,978,470 A | 11/1999 | Shaffer et al. |
| 5,982,774 A | 11/1999 | Foladare et al. |
| 5,982,784 A | 11/1999 | Bell |
| 5,987,100 A | 11/1999 | Fortman et al. |
| 5,987,508 A | 11/1999 | Agraharam et al. |
| 5,991,380 A | 11/1999 | Bruno et al. |
| 5,995,606 A | 11/1999 | Civanlar et al. |
| 5,999,525 A | 12/1999 | Krishnaswamy et al. |
| 5,999,598 A | 12/1999 | Henrick et al. |
| 5,999,602 A | 12/1999 | Yang et al. |
| 5,999,612 A | 12/1999 | Dunn et al. |
| 6,005,861 A | 12/1999 | Humpleman |
| 6,005,873 A | 12/1999 | Amit |
| 6,006,253 A | 12/1999 | Kumar et al. |
| 6,009,410 A | 12/1999 | LeMole et al. |
| 6,011,909 A | 1/2000 | Newlin et al. |
| 6,014,427 A | 1/2000 | Hanson et al. |
| 6,016,336 A | 1/2000 | Hanson |
| 6,020,915 A | 2/2000 | Bruno et al. |
| 6,023,724 A | 2/2000 | Bhatia et al. |
| 6,026,441 A | 2/2000 | Ronen |
| 6,028,848 A | 2/2000 | Bhatia et al. |
| 6,028,867 A | 2/2000 | Rawson et al. |
| 6,031,896 A | 2/2000 | Gardell et al. |
| 6,031,899 A | 2/2000 | Wu |
| 6,031,906 A | 2/2000 | Rao |
| 6,038,233 A | 3/2000 | Hamamoto et al. |
| 6,044,403 A | 3/2000 | Gerszberg et al. |
| 6,047,063 A | 4/2000 | Perry |
| 6,049,594 A | 4/2000 | Furman et al. |
| 6,052,444 A | 4/2000 | Ferry et al. |
| 6,052,594 A | 4/2000 | Chuang et al. |
| 6,052,725 A | 4/2000 | McCann et al. |
| 6,061,434 A | 5/2000 | Corbett |
| 6,069,879 A | 5/2000 | Chatter |
| 6,075,796 A | 6/2000 | Katseff et al. |
| 6,078,886 A | 6/2000 | Dragosh et al. |
| 6,084,292 A | 7/2000 | Shinohara |
| 6,085,231 A | 7/2000 | Agraharam et al. |
| 6,088,368 A | 7/2000 | Rubinstain et al. |
| 6,101,246 A | 8/2000 | Heinmiller et al. |
| 6,104,704 A | 8/2000 | Buhler et al. |

(56) References Cited

U.S. PATENT DOCUMENTS

| | | | |
|---|---|---|---|
| 6,104,800 A | 8/2000 | Benson |
| 6,108,330 A | 8/2000 | Bhatia et al. |
| 6,115,393 A | 9/2000 | Engel et al. |
| 6,118,432 A | 9/2000 | Kotorov et al. |
| 6,118,768 A | 9/2000 | Bhatia et al. |
| 6,118,778 A | 9/2000 | Amin |
| 6,118,784 A | 9/2000 | Tsuchiya et al. |
| 6,122,357 A | 9/2000 | Farris et al. |
| 6,125,376 A | 9/2000 | Klarlund et al. |
| 6,128,304 A | 10/2000 | Gardell et al. |
| 6,131,119 A | 10/2000 | Fukui |
| 6,134,235 A | 10/2000 | Goldman et al. |
| 6,137,870 A | 10/2000 | Scherer |
| 6,138,100 A | 10/2000 | Dutton et al. |
| 6,144,401 A | 11/2000 | Casement et al. |
| 6,144,667 A | 11/2000 | Doshi et al. |
| 6,148,067 A | 11/2000 | Leipow |
| 6,154,531 A | 11/2000 | Clapper |
| 6,160,880 A | 12/2000 | Allen |
| 6,163,531 A | 12/2000 | Kumar |
| 6,167,043 A | 12/2000 | Frantz |
| 6,173,250 B1 | 1/2001 | Jong |
| 6,175,619 B1 | 1/2001 | DeSimone |
| 6,185,288 B1 | 2/2001 | Wong |
| 6,188,756 B1 | 2/2001 | Mashinsky |
| 6,192,116 B1 | 2/2001 | Mayak |
| 6,201,797 B1 | 3/2001 | Leuca et al. |
| 6,229,810 B1 | 5/2001 | Gerszberg et al. |
| 6,229,887 B1 | 5/2001 | Albers et al. |
| 6,233,235 B1 | 5/2001 | Burke et al. |
| 6,233,313 B1 | 5/2001 | Farris et al. |
| 6,243,388 B1 | 6/2001 | Mussman et al. |
| 6,243,445 B1 | 6/2001 | Begeja et al. |
| 6,252,952 B1 | 6/2001 | Kung et al. |
| 6,262,979 B1 | 7/2001 | Anderson et al. |
| 6,263,065 B1 | 7/2001 | Durinovic-Johri et al. |
| 6,263,503 B1 | 7/2001 | Margulis |
| 6,266,340 B1 | 7/2001 | Pickett et al. |
| 6,266,405 B1 | 7/2001 | Madour et al. |
| 6,285,750 B1 | 9/2001 | Brachman et al. |
| 6,289,025 B1 | 9/2001 | Pang et al. |
| 6,292,553 B1 | 9/2001 | Fellingham et al. |
| 6,295,298 B1 | 9/2001 | Hrastar et al. |
| 6,298,120 B1 | 10/2001 | Civanlar et al. |
| 6,300,947 B1 | 10/2001 | Kanevsky |
| 6,304,566 B1 | 10/2001 | Schessel |
| 6,304,573 B1 | 10/2001 | Hicks, III |
| 6,304,636 B1 | 10/2001 | Goldberg et al. |
| 6,310,889 B1 | 10/2001 | Parsons et al. |
| 6,317,684 B1 | 11/2001 | Roeseler et al. |
| 6,317,884 B1 | 11/2001 | Eames et al. |
| 6,324,279 B1 | 11/2001 | Kalmanek, Jr. et al. |
| 6,327,346 B1 | 12/2001 | Infosino |
| 6,332,139 B1 | 12/2001 | Kaneko et al. |
| 6,333,931 B1 | 12/2001 | LaPier et al. |
| 6,339,594 B1 | 1/2002 | Civanlar et al. |
| 6,343,074 B1 | 1/2002 | Pickett |
| 6,343,115 B1 | 1/2002 | Foladare et al. |
| 6,347,075 B1 | 2/2002 | Barzegar et al. |
| 6,351,464 B1 | 2/2002 | Galvin et al. |
| 6,353,611 B1 | 3/2002 | Norris et al. |
| 6,356,546 B1 | 3/2002 | Beshai |
| 6,359,881 B1 | 3/2002 | Gerszberg et al. |
| 6,363,411 B1 | 3/2002 | Dugan et al. |
| 6,366,578 B1 | 4/2002 | Johnson |
| 6,373,817 B1 | 4/2002 | Kung et al. |
| 6,374,124 B1 | 4/2002 | Slabinski |
| 6,385,202 B1 | 5/2002 | Katseff et al. |
| 6,385,646 B1 | 5/2002 | Brown et al. |
| 6,389,114 B1 | 5/2002 | Dowens et al. |
| 6,393,014 B1 | 5/2002 | Daly et al. |
| 6,393,017 B1 | 5/2002 | Galvin et al. |
| 6,404,735 B1 | 6/2002 | Beshai et al. |
| 6,418,139 B1 | 7/2002 | Akhtar |
| 6,418,146 B1 | 7/2002 | Miloslavsky |
| 6,421,425 B1 | 7/2002 | Bossi et al. |
| 6,424,646 B1 | 7/2002 | Gerszberg et al. |
| 6,425,131 B2 | 7/2002 | Crandall et al. |
| 6,437,692 B1 | 8/2002 | Petite et al. |
| 6,438,222 B1 | 8/2002 | Burg |
| 6,438,223 B1 | 8/2002 | Eskafi et al. |
| 6,442,266 B1 | 8/2002 | Wu |
| 6,449,766 B1 | 9/2002 | Fleming |
| 6,452,923 B1 | 9/2002 | Gerszberg et al. |
| 6,456,699 B1 | 9/2002 | Burg et al. |
| 6,459,913 B2 | 10/2002 | Cloutier |
| 6,467,090 B1 | 10/2002 | Brodigan |
| 6,480,748 B1 | 11/2002 | Gerszberg et al. |
| 6,490,274 B1 | 12/2002 | Kim |
| 6,493,324 B1 | 12/2002 | Truetken |
| 6,501,740 B1 | 12/2002 | Sun et al. |
| 6,505,348 B1 | 1/2003 | Knowles et al. |
| 6,510,152 B1 | 1/2003 | Gerszberg et al. |
| 6,519,246 B1 | 2/2003 | Strahs |
| 6,519,249 B1 | 2/2003 | Bennefeld et al. |
| 6,522,628 B1 | 2/2003 | Patel et al. |
| 6,532,286 B1 | 3/2003 | Burg |
| 6,542,500 B1 | 4/2003 | Gerszberg et al. |
| 6,560,222 B1 | 5/2003 | Pounds et al. |
| 6,570,855 B1 | 5/2003 | Kung et al. |
| 6,570,974 B1 | 5/2003 | Gerszberg et al. |
| 6,587,782 B1 | 7/2003 | Nocek et al. |
| 6,590,867 B1 | 7/2003 | Ash et al. |
| 6,621,895 B1 | 9/2003 | Giese |
| 6,633,635 B2 | 10/2003 | Kung et al. |
| 6,633,848 B1 | 10/2003 | Johnson et al. |
| 6,640,239 B1 | 10/2003 | Gidwani |
| 6,650,901 B1 | 11/2003 | Schuster et al. |
| 6,657,981 B1 * | 12/2003 | Lee et al. .................. 370/331 |
| 6,687,360 B2 | 2/2004 | Kung et al. |
| 6,690,675 B1 | 2/2004 | Kung et al. |
| 6,734,867 B1 | 5/2004 | Munshi et al. |
| 6,744,767 B1 | 6/2004 | Chiu et al. |
| 6,771,742 B2 | 8/2004 | McCalmont et al. |
| 6,775,267 B1 | 8/2004 | Kung et al. |
| 6,823,260 B1 | 11/2004 | Turcotte |
| 6,826,173 B1 | 11/2004 | Kung et al. |
| 6,836,476 B1 | 12/2004 | Dunn et al. |
| 6,904,176 B1 | 6/2005 | Chui et al. |
| 6,912,545 B1 | 6/2005 | Lundy et al. |
| 6,940,950 B2 | 9/2005 | Dickinson et al. |
| 6,986,154 B1 | 1/2006 | Price et al. |
| 7,006,614 B2 | 2/2006 | Feinberg et al. |
| 7,027,564 B2 | 4/2006 | James |
| 7,042,985 B1 | 5/2006 | Wright |
| 7,054,313 B1 | 5/2006 | Gerszberg et al. |
| 7,062,572 B1 | 6/2006 | Hampton |
| 7,099,443 B2 | 8/2006 | Phillips et al. |
| 7,110,395 B1 | 9/2006 | Blair |
| 7,127,044 B1 | 10/2006 | Becker et al. |
| 7,149,499 B1 | 12/2006 | Oran et al. |
| 7,177,399 B2 | 2/2007 | Dawson et al. |
| 7,180,988 B2 | 2/2007 | Phillips et al. |
| 7,181,401 B2 | 2/2007 | Johnson et al. |
| 7,200,673 B1 | 4/2007 | Augart |
| 7,239,698 B2 | 7/2007 | Phillips et al. |
| 7,257,387 B2 | 8/2007 | Laliberte |
| 7,260,186 B2 * | 8/2007 | Zhu et al. .................. 379/45 |
| 7,366,157 B1 | 4/2008 | Valentine et al. |
| 7,379,436 B2 | 5/2008 | Jiang |
| 7,379,455 B2 | 5/2008 | Pickett |
| 7,391,761 B1 | 6/2008 | Ruckart et al. |
| 7,437,162 B1 * | 10/2008 | Zhang et al. .................. 455/445 |
| 7,453,990 B2 | 11/2008 | Welenson et al. |
| 7,474,742 B2 | 1/2009 | Cook |
| 7,496,360 B2 | 2/2009 | Sindhwani et al. |
| 7,508,928 B1 | 3/2009 | Everson et al. |
| 7,573,988 B2 | 8/2009 | Lee et al. |
| 7,580,405 B2 | 8/2009 | Laliberte |
| 7,586,902 B2 | 9/2009 | Epley |
| 7,746,905 B2 | 6/2010 | Binder |
| 7,796,738 B2 | 9/2010 | Wright |
| 7,843,923 B2 | 11/2010 | Baum |
| 7,843,934 B2 | 11/2010 | Baum et al. |

(56) References Cited

U.S. PATENT DOCUMENTS

| | | | |
|---|---|---|---|
| 7,940,746 B2* | 5/2011 | Livingood | 370/352 |
| 8,027,691 B2 | 9/2011 | Bernas et al. | |
| 8,095,115 B2* | 1/2012 | van de Groenendaal | 455/411 |
| 8,175,587 B2 | 5/2012 | Preece | |
| 8,265,587 B2 | 9/2012 | D'Evelyn et al. | |
| 8,635,661 B2 | 1/2014 | Shahbazi | |
| 8,724,522 B2* | 5/2014 | Livingood | 370/259 |
| 2001/0004382 A1 | 6/2001 | Van Wonterghem | |
| 2002/0013941 A1 | 1/2002 | Ward et al. | |
| 2002/0056112 A1 | 5/2002 | Dureau et al. | |
| 2002/0065935 A1 | 5/2002 | Koperda et al. | |
| 2002/0087666 A1 | 7/2002 | Huffman et al. | |
| 2002/0164993 A1 | 11/2002 | Elliot | |
| 2003/0065442 A1 | 4/2003 | Touney | |
| 2003/0081377 A1 | 5/2003 | Lin | |
| 2003/0104822 A1 | 6/2003 | Bentley | |
| 2003/0120817 A1 | 6/2003 | Ott et al. | |
| 2003/0204393 A1 | 10/2003 | Czerwiec et al. | |
| 2003/0214939 A1 | 11/2003 | Eldumiati et al. | |
| 2004/0001479 A1 | 1/2004 | Pounds et al. | |
| 2004/0001501 A1 | 1/2004 | Delveaux et al. | |
| 2004/0057425 A1 | 3/2004 | Brouwer et al. | |
| 2004/0073597 A1 | 4/2004 | Caveney et al. | |
| 2004/0125819 A1 | 7/2004 | Binder | |
| 2004/0140928 A1 | 7/2004 | Cleghorn | |
| 2004/0151168 A1 | 8/2004 | Phillips et al. | |
| 2004/0151290 A1 | 8/2004 | Magarasevic et al. | |
| 2004/0153577 A1 | 8/2004 | Phillips et al. | |
| 2004/0176085 A1 | 9/2004 | Phillips et al. | |
| 2004/0203896 A1 | 10/2004 | Deigin et al. | |
| 2005/0083912 A1* | 4/2005 | Afshar et al. | 370/352 |
| 2005/0141431 A1 | 6/2005 | Caveney et al. | |
| 2005/0144645 A1 | 6/2005 | Casey et al. | |
| 2005/0192999 A1 | 9/2005 | Cook et al. | |
| 2005/0198374 A1 | 9/2005 | Suzuki | |
| 2005/0213565 A1* | 9/2005 | Barclay et al. | 370/352 |
| 2005/0213716 A1 | 9/2005 | Zhu et al. | |
| 2005/0243973 A1* | 11/2005 | Laliberte | 379/37 |
| 2006/0056388 A1* | 3/2006 | Livingood | 370/352 |
| 2006/0120517 A1 | 6/2006 | Moon et al. | |
| 2006/0143278 A1 | 6/2006 | Bauchot et al. | |
| 2006/0174015 A1 | 8/2006 | Arauz-Rosado | |
| 2006/0188073 A1 | 8/2006 | Wright | |
| 2006/0262913 A1 | 11/2006 | Cook et al. | |
| 2006/0264204 A1* | 11/2006 | Livingood | 455/412.2 |
| 2006/0271632 A1* | 11/2006 | Livingood | 709/206 |
| 2006/0293024 A1 | 12/2006 | Benco et al. | |
| 2007/0013516 A1 | 1/2007 | Freitag et al. | |
| 2007/0092070 A1 | 4/2007 | Croy et al. | |
| 2007/0147345 A1 | 6/2007 | Lowmaster | |
| 2007/0233899 A1 | 10/2007 | Aborn | |
| 2007/0259645 A1 | 11/2007 | Laliberte | |
| 2008/0026781 A1 | 1/2008 | Ho et al. | |
| 2008/0301322 A1 | 12/2008 | Horibe | |
| 2009/0274145 A1 | 11/2009 | Laliberte | |
| 2010/0029246 A1 | 2/2010 | Binning | |
| 2011/0069183 A1 | 3/2011 | Edwards et al. | |
| 2011/0116420 A1* | 5/2011 | Livingood | 370/259 |
| 2012/0013702 A1* | 1/2012 | Livingood | 348/14.01 |
| 2014/0293996 A1* | 10/2014 | Livingood | 370/352 |

FOREIGN PATENT DOCUMENTS

| | | | |
|---|---|---|---|
| EP | 0794643 | A2 | 9/1997 |
| EP | 0800325 | A2 | 10/1997 |
| EP | 0848560 | A2 | 6/1998 |
| EP | 0856981 | A2 | 8/1998 |
| EP | 0905959 | A2 | 3/1999 |
| WO | 9518501 | A1 | 7/1995 |
| WO | 9714238 | A1 | 4/1997 |
| WO | 9716007 | A1 | 5/1997 |
| WO | 9737483 | A1 | 10/1997 |
| WO | 9746073 | A2 | 12/1997 |
| WO | 9747118 | A1 | 12/1997 |
| WO | 9747119 | A1 | 12/1997 |
| WO | 9747127 | A1 | 12/1997 |
| WO | 9801985 | A1 | 1/1998 |
| WO | 9807266 | A1 | 2/1998 |
| WO | 9819240 | A2 | 5/1998 |
| WO | 9819448 | A1 | 5/1998 |
| WO | 9819471 | A1 | 5/1998 |
| WO | 9824224 | A1 | 6/1998 |
| WO | 9830002 | A2 | 7/1998 |
| WO | 9836551 | A1 | 8/1998 |
| WO | 9841032 | A2 | 9/1998 |
| WO | 9851063 | A1 | 11/1998 |
| WO | 9852332 | A1 | 11/1998 |
| WO | 9852339 | A1 | 11/1998 |
| WO | 9853617 | A2 | 11/1998 |
| WO | 9854871 | A1 | 12/1998 |
| WO | 9914924 | A1 | 3/1999 |
| WO | 9916201 | A2 | 4/1999 |
| WO | 9944352 | A1 | 9/1999 |
| WO | 9953719 | A1 | 10/1999 |

OTHER PUBLICATIONS

Odlyzko, et al., A Modest Proposal for Preventing Internet Congestion, DIMACS Technical Report, pp. 1-25, Sep. 1997.

PKT-TR-ARCH-V01-991201, Packetcable 1.0 Architecture Framework Technical Report, CableLabs, pp. 1-64, Dec. 1, 1999.

Rupp et al., "INDEX: A Platform for Determining How People Value the Quality of their Internet Access", Proceedings of the Sixth IEEE/IFIP International Workshop on Quality of Service, Napa CA, pp. 85-90, May 1998.

Holliday, Clifford R., "The Residential Gateway", IEEE Spectrum Magazine; May 1997, pp. 29-31.

Meggers, J. et al., "Providing Video Conferencing for the Mobile User", Local Computer Networks, Proceedings 21st IEEE Conference, 1996, pp. 526-534.

Umehira, M., et al. "Wireless and IP Integrated System Architectures for Broadband Mobile Multimedia Services", Wireless Communications and Networking Conference, WCNC, 1999 IEEE, 1999, pp. 593-597.

Albrecht, Markus, et al., "IP Services Over Bluetooth: Leading the Way to a New Mobility", IEEE 1999, 10 pages.

Perkins, Charles E., "Mobile-IP, Ad-Hoc Networking, and Nomadicity", IEEE 1996, pp. 472-476.

Jacobs, Stuart, "Security of Current Mobile IP Solutions", IEEE 1997, pp. 1122-1128.

Deering, S., Internet RFC/STD/FYI/BCP Archives, Internet Protocol, Version 6 specification, Dec. 1995, Xerox PARC, 38 pages.

* cited by examiner

LOCATING A VOICE OVER PACKET (VOP) DEVICE CONNECTED TO A NETWORK

CROSS-REFERENCE TO RELATED APPLICATIONS

This application is a continuation of U.S. application Ser. No. 14/224,785, filed Mar. 25, 2014, which is a continuation of U.S. application Ser. No. 13/012,959, filed on Jan. 25, 2011, now U.S. Pat. No. 8,724,522, which is a continuation of U.S. application Ser. No. 10/924,485 filed on Aug. 24, 2004, now U.S. Pat. No. 7,940,746. The entire contents of all of these priority applications are herein incorporated by reference.

FIELD OF THE INVENTION

The present invention relates to methods and systems for locating a device connected to a network, such as to locate a Voice Over Internet Protocol (VoIP) device.

BACKGROUND ART

Voice Over Internet Protocol (VoIP) or Internet Protocol (IP) Telephony is a technology that allows a user to make a telephone call over the Internet or a dedicated network in IP packets, instead of over dedicated voice transmission lines.

With a VoIP service, it is possible for a user to move their VoIP phone to virtually any IP network and have the ability to make and receive calls at their home phone number, which is commonly referred to as a personal telephone number (TN). This is, in fact, one of the benefits of VoIP service, whereby for example a user can take their VoIP phone with them to a hotel with broadband Internet service and have their home phone ring in their hotel room. By contrast, traditional telephone service is tied to a specific location by nature of the circuit-based telephone network.

The problem with this new capability of VoIP, however, is that the traditional approach utilized by emergency services personnel to locate an individual in the event of an emergency 911 call no longer works reliably in VoIP systems. For example, a VoIP customer's location is recorded as their billing address and all calls originating from the customer's VoIP phone are assumed to be originating from the home address of the customer. If the customer takes the VoIP phone to a second location, such as a shore vacation home for the weekend, and a life-threatening medical emergency prompts the customer to dial 911, then the 911 call would be routed to the Public Safety Answering Point (PSAP) in the area of the customer's billing address, not their current address at the shore vacation residence.

Some VoIP service providers have attempted to solve this by routing 911 calls on their VoIP network to an intermediate dispatch center that determines which PSAP to route the call to. The intermediate dispatch center includes an operator for answering the emergency 911 call. The operator interrogates the caller to determine their location and then routes the call to the PSAP in the location of the caller. However, this approach can add extra time to the emergency response that can be critical to safety. Moreover, it is a labor intensive and relatively expensive for the service provider to maintain.

SUMMARY OF THE INVENTION

It is, therefore, an object of the present invention to provide a method and system for locating a VoIP customer.

The present invention contemplates a number of features for locating a VoIP customer, including a processing unit configured for operation on a network used to support VoIP calls. The processing unit preferably includes a processor and a memory configured for locating a VoIP customer by locating a VoIP device used by the customer.

The processing unit is configured to determine a current network address for the VoIP device on the network. Once the current network address is determined, the processing unit is configured to locate a user profile stored on the processing unit that is associated with the VoIP device. The user profile includes at least one physical address associated with a network address so that the processing unit can determine if the current network address matches with any of the network addresses in the user profile. The processing unit then determines a location of the VoIP device to be at the physical address associated with the network address that matches the current network address of the VoIP device.

The processing unit can be configured to provide the location of the VoIP device to a public safety answering point (PSAP) in the event of an emergency, such as if the VoIP customer using the VoIP device is making an emergency call.

One advantage of the present invention is that it permits emergency services to be provided without maintaining an emergency services dispatch center. This permits emergency calls to be routed to the appropriate authorities more quickly, leading to increased safety and security for customers, lower cost for the service provider, and better VoIP service features relative to competitors.

Another advantage of the present invention is that it is IP-network-based such that it can encompass other VoIP devices beyond telephones, such as instant messaging clients, and other real-time communication tools (text, audio, and/or video-based). In this manner, these non-telephone items can be used to make emergency calls over the VoIP system and have the location of the calling party determined.

DETAILED DESCRIPTION OF THE PREFERRED EMBODIMENT(S)

Figure 1:
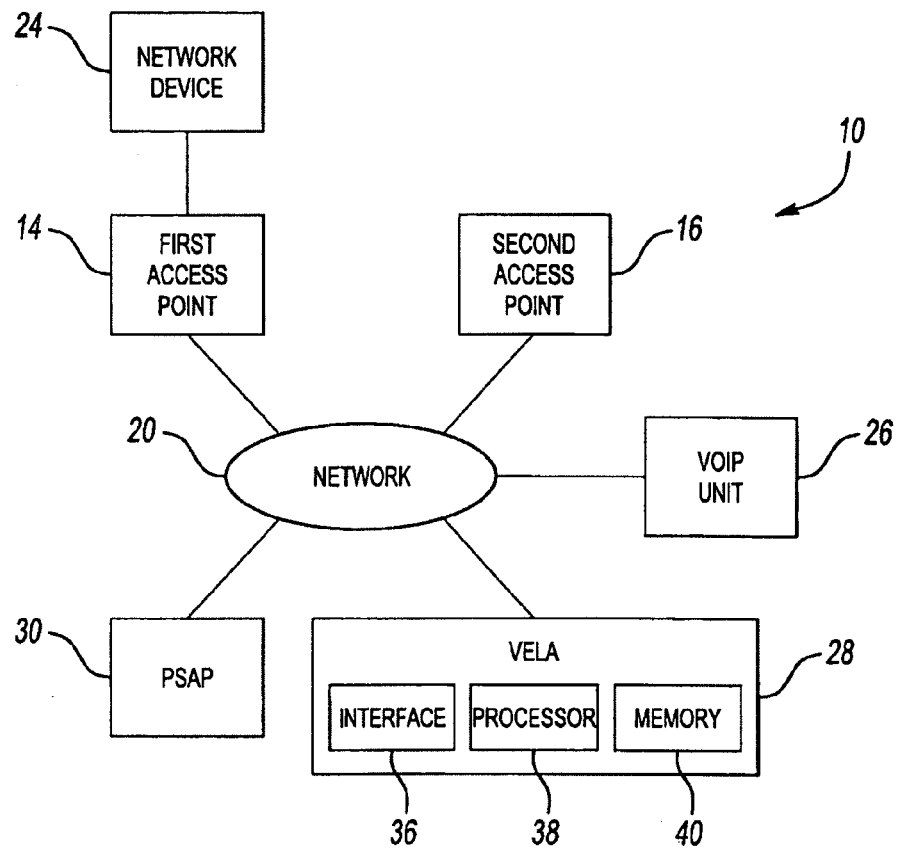
FIG. 1 illustrates a network system in accordance with one aspect of the present invention.

FIG. 1 illustrates a network system 10 in accordance with one aspect of the present invention. The network system 10 generally includes a first access point 14, a second access point 16, and a network 20 such that data and signals communicated over the network 20 are accessible by connected a network device 24 to one of the access points 14 and 16.

The network device 24 can be any type of computer or other item that is capable of network communications, such as computers, servers, personal digital assistants (PDAs), and the like. In particular, the present invention contemplates that the network device 24 is a Voice Over Internet Protocol (VoIP) device that is configured to make VoIP telephone calls over the network 20. In support thereof, the system 10 further includes a VoIP unit 26, a VoIP emergency location application (VELA) or processing unit 28, and a Public Safety Answering Point (PSAP) 30.

The VoIP device 24 can relate to any device that is capable of making VoIP calls. Such devices can include a number of features, including a telephone with an analog terminal adapter (ATA), a software-based Session Initiation Protocol (SIP) phone, a stand-alone or embedded Message Transfer Agent (MTA) device, a videophone (whether hardware-based or software-based), a wireless phone (generally cellular phones), a Personal Digital Assistant (PDA) with VoIP software, and the like. Preferably, the VoIP device 24 includes a unique personal telephone number that allows the device 24 to receive VoIP telephone calls anytime that it is connected to the network 20.

The first and second access points 14 and 16 are nodes or other features that are configured to connect the network device 24 to the network 20. The system 10 shown in FIG. 1 only indicates two access points 14 and 16, but it is contemplated that the system 10 may include any number of access points in any number of geographical areas. Preferably, a network address, such as an IP address, is associated with each access point to identify its location on the network 20.

The network 20 generally relates to any configuration that permits network communication and VoIP calls, such as through the exchange or transfer of electronic signals and packets over private IP networks, the Internet, or public switching telephone network (PSTN). It can include servers, databases, softswitches, and the like which function to enable, route, and/or control voice, video, and text-based communications and can include items generally described as VoIP softswitches, PacketCable Call Management Servers (CMS), VoIP call servers, IP Public Branch Exchanges (PBXs), SIP Proxy servers, SIP Registrar servers, SIP switches, and the like.

The PSAP 30 generally relates to a dispatch office that routes incoming 911 calls, or directly dispatches a public service department, such as a fire, police, or other emergency department. Preferably, the PSAP can receive calls over a PSTN and electronically over the Internet or other IP networks, or through other communications means, such as satellite or other wireless communication. In particular, the PSAP may be an enhanced 911 (E911) dispatch center that is capable of exchanging signals through IP-network-based applications, such as instant messaging clients, real-time communication tools (text, audio, and/or video-based), and other non-telephone clients.

The VELA 28 is configured in accordance with the present invention to communicate with the network 20 and to determine the location of a user on the network 20 based on a location of the network device 24, such as by determining whether the network device 24 is at the first access point 14 or the second access point 16. This can be advantageous for locating the user in the event of an emergency, such as when the user makes an emergency 911 call using a VoIP device from one of the access points 14 and 16.

The VELA 28 preferably includes an interface 36 that is configured for exchanging signals and packets with the network 20, such as for communicating with the VoIP device 24 and/or the PSAP 30 by exchanging signals and packets over the network to one or more of the access points 14 and 16. Preferably, the interface 36 includes an Interactive Voice Response (IVR) unit, Text to Speech (TTS), and/or a Speech to Text (STT) unit, which enables the interface 36 to convert speech received by the interface to electronic signals and to similarly output electronic signals to speech, such as to communicate with the user through the VoIP device 24. In particular, the interface 36 is able to output and receive voice and touch-tone signals to and from the VoIP device 24 so that the VELA 28 can communicate verbally with the user through a dialogue and record the responses of the user thereto.

The VELA 28 can be configured to route calls to the PSAP 30 via the PSTN using legacy methods of call networking/termination, to route calls via the public Internet or private Internet Protocol (IP) peering point, and to route calls to multiple interfaces of the PSAP 30, such as a primary interface preference and one or more secondary interfaces, based upon the PSAP's capabilities and preferences or the service provider's preferences. In addition, the VELA 28 can contact the secondary interface if the primary interface is not reachable for some reason, such as network congestion, network failure, etc.

The VELA 28 preferably includes a processor 38 and a memory 40 for controlling operation of the interface 36 and for executing other applications and strategies, which preferably includes a 911 call routing/query response application for transferring 911 calls from the access point to the PSAP associated with a location of the user, as described below in more detail. The VELA 28 can include other optional features, such as a web interface application configured to enable user location configuration, selection, and/or confirmation, and a video/graphic interface application configured to enable user location configuration, selection, and/or confirmation via a textual or graphical interface on a particular type of device (cellular phone screen, video phone screen, etc.).

The VELA 28 can optionally detect the type of network device 24 based upon information derived from its connection to the network 20. When one of these devices with graphical capabilities is used, the VELA 28 can be configured to, instead of initiating an out-dial, initiate a multimedia message to the user's device or present that device with a graphical interface. The user can respond to that message by pressing buttons on their device, clicking on the interface, or otherwise interacting with the graphical user interface or multimedia message. This interface may take several forms in the future but may be HTML-based, XML-based, or VoiceXML-based using today's technologies.

The VoIP unit 26 is a processing unit configured to permit and/or control VoIP communications. It can include any number of features, including memory and processors (not shown) that communicate with the network 20 for executing a VoIP application, such as a VoIP telephone call. In general, the system is configured to route calls to the VoIP device 24 based on the telephone number assigned to it so that a user can receive calls on the telephony device at any access point 14 and 16 on the network 20 that is in communication with the VoIP unit 26.

The system 10 shown in FIG. 1 is only provided for exemplary purposes and is not intended to limit the scope of the present invention. Rather, the present invention contemplates that the system 10 may include more or less features than those shown in FIG. 1. In particular, the VoIP device 24 and each of the access points 14 and 16 are illustrated as separate items, however, the present invention contemplates that an access point may be integrated into the VoIP device 24 and, in addition, that these two items may be further integrated into a fixed or portable communications and/or computing device.

Figure 2:
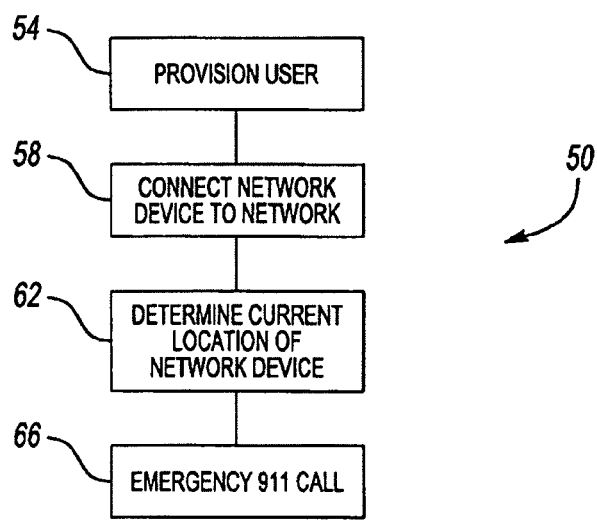
FIG. 2 illustrates a flowchart of a method for determining a location of a device connected to a network in accordance with one aspect of the present invention.

FIG. 2 illustrates a flowchart 50 of a method for locating the network device (VoIP device) when it is connected to a network. The method is advantageous in locating the user in the event of an emergency 911 call from the network device 24 and for routing the emergency 911 call to the PSAP 30 associated with the location of the user.

Block 54 relates to provisioning a user for operation with the VELA. The provisioning can include any number of features, and generally comprises creating and storing a user profile in the database of the VELA. The user profile can be created by an operator inputting the user's information into the VELA, by the user inputting the information themselves, such as through a graphical user interface (GUI) or web page, and/or automatically by querying the VoIP device when it is connected to the network, which is advantageous for determining the IP address and network hops associated with the access point to which the user connects the VoIP device, as it may be difficult for the user or operator to input this information. Optionally, block 54 can be skipped and the user profile can be created dynamically upon connecting the VoIP device to one of the access points.

The user profile preferably identifies the user with a telephone number and includes additional location information, such as a physical address (city, state, zip code, apartment number, etc.) and network address (IP address and network hops) for the access point from which the user intends to connect to the network for making VoIP telephone calls. The network address is associated with the physical address as the physical addresses are more unique than the network addresses. This is because the network addresses may not, by nature of them being shared across what may be a small or large area and one or many people, be at the same location as the user, or at least within a small enough area relative to the access point associated with the user that emergency personnel would be able to locate the user in an emergency. Network addresses may also be dynamically assigned, such that the same physical address will show up at different network addresses over time. The physical location indicates where the user is located when connecting to the access point associated with the current network address so that the user can be located in the event of an emergency 911 call.

Multiple entries can be made in the user profile if the user intends to use the VoIP device at multiple locations on the network. Preferably, a nickname or another unique identifier is provided if the user profile includes multiple residences or locations for the user so that each location can be easily distinguished. For example, the user may intend to use the VoIP device at home, at a beach vacation home, and at work. In which case, the user profile is provisioned with physical and network address for each of the locations.

Block 58 relates to connecting the VoIP device to the network, such as if the user intends to make a call or if the user is merely connecting the device to the network to receive calls, which may occur in the act of turning on or plugging in a device. Upon connecting to the network or in response to a message from the VELA, the VoIP device sends a message to the VELA that includes the telephone number assigned with the VoIP device. The VELA analyzes the message to determine the IP address of the access point to which the VoIP device is connected and to determine any network hops between the access point and the VELA, such as by tracer-outing the IP address to determine the network hops. This information is then stored in the memory of the VELA for use in determining a location of the user. Depending upon the results of this transaction, the user may be queried by the VELA to confirm his/her correct physical location, select from a list of locations which may or may not be sorted based upon the VELA's best estimate of the location, or choose to configure a new location in the VELA.

Block 62 relates to determining a current location for the user based on the telephone number and network address determined in block 58. Initially, the VELA uses the telephone number to search the database for a user profile that includes the same telephone number, i.e. to match a user profile with the telephone number. Once the user profile is located, the VELA compares the network address determined in block 58 with the network addresses in the user profile. If one of the network addresses matches, the VELA pulls the associated physical address and controls the interface to contact the user, such as through an out-going call or other message to the user and/or their telephony device. The user is then asked whether the physical address corresponds with the current location of the user. If the user to determine their location. The location is denied, for example, if there is an error during the inputting of the physical location to the user profile, if the user intends to be at a different location but maintains the use of the same access point, and if the user failed to provide a physical address in the user profile. In response to the denial, the VELA interrogates the user further to determine the physical address that they desire to associate with the network address. This information is then stored in the user profile so that it is available the next time the user connects to the network and the current location of the user is noted.

If none of the network addresses in the user profile match the network address determined in block 58, then the user is in an unknown or new location. In which case, the VELA controls the interface to contact the user, such as through an out-going call or message, to create an entry for the unknown network ID. The entry is similar to those described above, in that the user is questioned by the VELA to determine a physical address and nickname for association with the unknown network address. Once the entry is complete, the physical address associated with the new entry is added to the user's profile and noted as the current location of the user.

The dialogue to determine the location of the user, as described above, can take any number of forms. For example, the VELA can be configured to provide the following sequential dialogue:

1. This is the 911 Service Application calling. We were unable to automatically determine your location. Please tell us where your phone is connected so that we can connect your call appropriately in case you have an emergency.
   a. Press 1 now if you are calling from "Home."
      i. 1 pressed, You are calling from "Home."
      ii. If this is incorrect, press # to go back to the main menu.
      iii. If this is correct, press 1 now or hangup.
      i. 1 pressed, You are calling from "Home."
      ii. If this is incorrect, press # to go back to the main menu.
      iii. If this is correct, press 1 now or hangup.
      iv. If the address of this location has changed, press 2 now to record the new address.
   b. Press 2 now if you are calling from "Beach House."
      i. 2 pressed, You are calling from "Beach House."
      ii. If this is incorrect, press # to go back to the main menu.
      iii. If this is correct, press 1 now or hangup.
      iv. If the address of this location has changed, press 2 now to record the new address. (Speech to Text engine invoked.)
   c. Press 3 now if you are calling from "Work."
      i. 3 pressed, You are calling from "Work."
      ii. If this is incorrect, press # to go back to the main menu.
      iii. If this is correct, press 1 now or hangup.
      iv. If the address of this location has changed, press 2 now to record the new address.
   d. Press 4 now if you are calling from a new location.
      i. We need a nickname for this location, such as "Home" or "Beach House." Please speak the nickname of your location now.
      ii. We need a house number for this location. Please speak the number now or use your keypad.
      iii. We need a street for this location. Please speak the street now.
      iv. We need a city for this location. Please speak the city now.
      v. We need a State for this location. Please speak the State now.

vi. We need a ZIP Code for this location. Please speak the ZIP Code now or use your keypad. (The ZIP Code could be used to avoid having to ask for the city and state, if desired.)

The VELA can also be configured with a location matching application (LMA) to facilitate locating the user. In general, the LMA is a process of matching network address determined upon connection of the VoIP device to the network addresses in the user profile when the network addresses fails to exactly match, such as if the user is at the same physical location but using a different access point or an access point the utilizes multiple network address. The VELA utilizes the LMA to predictively attempt to match the network address (location of the user) by executing the following logical operations:

1. Does the current network address detected match a network address in the user profile? If so, match the current network address to the corresponding network address in the user profile and dialogue with the user to determine that the physical address associated therewith corresponds with the current location of the user, if not, proceed to next step.

2. VELA performs a traceroute on the current network address and records every hop in the traceroute. Does the first hop of the traceroute match any of the hops (first or otherwise) for the other network addresses in the user profile. If so, match the current network address to the corresponding network address in the user profile and dialogue with the user to determine the physical address associated therewith corresponds with the current location of the user, if not, proceed to next step.

3. Does the second hop of the traceroute match any of the hops in the Location Database for the user. If so, match the current network address to the corresponding network address in the user profile and dialogue with the user to determine the physical address associated therewith corresponds with the current location of the user, if not, proceed to next step with the remainder of the hops recorded by the trace route.

As described above, the LMA utilizes intermediate network hops for the current network address of the user to locate the physical address of the user. This can be advantageous to narrow down a geographical area in which the user is located. For example, the physical address of the user can be approximated by the intermediate network hops if they match with any of the intermediate network hops in the user profile.

Block 66 relates to the user making an emergency 911 call. The emergency call is recognized by the VELA and routed to the appropriate PSAP based upon the location of the user determined in block 62. Each time the user connects their VoIP device to another access point, the process above is repeated to determine the location of the user. As such, anytime the user makes an emergency 911 call the VELA is able to locate the user and route the call to the appropriate PSAP. Preferably, the VELA includes logic or memory maps that facilitate locating the appropriate PSAP. For example, the VELA may include a database of PSAPs that are associated with either the physical address or the network address in the various user profiles.

When a user dials 911, the softswitch routes the call to the VELA, which routes the call to the appropriate PSAP (see PSAP Interface Technical Options below), based upon the user's current location. No call to an intermediate dispatch center is needed. Alternatively, the softswitch could perform a query to the VELA to obtain the current PSAP for the VoIP user's TN, passing this information back to the softswitch and enabling the softswitch to complete the call itself.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
   detecting, by a voice over packet (VoP) device, a network access point associated with an access point identifier;
   determining a physical address of the VoP device while the VoP device has access to the network access point; and
   storing, in a profile associated with the VoP device, an association between the access point identifier and the physical address.

2. The method of claim 1, further comprising:
   sending, via the network access point, a request for a VoP communication;
   associating the VoP device with the physical address based on the association with the access point identifier stored in the profile; and
   engaging in the VoP communication.

3. The method of claim 1, further comprising:
   detecting, by the VoP device, a second network access point associated with the access point identifier; and
   responsive to detecting the second network access point, prompting a user of the VoP device to confirm or update the association between the access point identifier and the physical address.

4. The method of claim 1, further comprising:
   responsive to a determination that the VoP device has access to a second network access point associated with the access point identifier, and that the second network access point is associated with a second physical address different from the physical address, updating the profile to associate the access point identifier with the second physical address.

5. The method of claim 1, wherein the VoP device is a wireless phone.

6. The method of claim 1, wherein the VoP device is a Voice over Internet Protocol (VoIP)-capable device.

7. The method of claim 1, wherein the profile is stored remotely from the VoP device.

8. The method of claim 1, further comprising engaging in a VoP communication.

9. The method of claim 1, wherein the determining the physical address of the VoP device while the VoP device has access to the network access point comprises determining the physical address by performing location matching for the VoP device.

10. The method of claim 1, wherein the determining the physical address of the VoP device while the VoP device has access to the network access point comprises estimating the physical address and requesting confirmation of the physical address from a user of the VoP device.

11. The method of claim 1, wherein the determining the physical address of the VoP device while the VoP device has access to the network access point comprises prompting a user of the VoP device to input the physical address.

12. The method of claim 11, further comprising denying the physical address input by the user if there is an error associated with the input.

13. The method of claim 1, further comprising confirming the physical address via feedback from the VoP device.

14. The method of claim 1, wherein the profile comprises a plurality of entries associating the device with a plurality of access point identifiers and, for each of the plurality of access point identifiers, an association with a corresponding physical address.

15. The method of claim 1, wherein the physical address comprises one or more of: a street address, a city, a state, and a zip code.

16. The method of claim 1, further comprising routing an emergency call to a Public Safety Answering Point (PSAP) based on the physical address.

17. A method comprising:
identifying a network access point accessible to a voice over packet (VoP) device;
receiving a physical address from the VoP device; and
storing, in a profile associated with the VoP device, an association between the physical address and the network access point for VoP calls involving the VoP device.

18. The method of claim 17, further comprising:
sending, via the network access point, a request for a requested VoP call involving the VoP device;
associating the VoP device with the physical address based on the association stored in the profile; and
engaging in the requested VoP call.

19. The method of claim 17, further comprising:
associating an access point identifier with the network access point;
detecting, by the VoP device, a second network access point associated with the access point identifier; and
responsive to detecting the second network access point, prompting a user of the VoP device to confirm or update the association stored in the profile.

20. The method of claim 17, wherein the VoP device is a wireless phone.

21. The method of claim 17, wherein the profile is stored remotely from the VoP device.

22. The method of claim 17, wherein the physical address comprises one or more of: a street address, a city, a state, and a zip code.

23. A method comprising:
determining that a voice over packet (VoP) device has access to a network via a network access point;
providing a user with an option to update a physical address currently associated with the network access point for VoP calls involving the VoP device;
receiving an updated physical address from the VoP device; and
updating a profile associated with the VoP device to associate the updated physical address with the network access point for VoP phone calls involving the VoP device.

24. The method of claim 23, further comprising denying the updated physical address if there is an error associated with a user input supplying the updated physical address.

25. The method of claim 23, wherein the profile comprises a plurality of entries associating the VoP device with a plurality of access point identifiers and, for each of the plurality of access point identifiers, an association with a corresponding physical address.

26. The method of claim 23, wherein the physical address comprises one or more of: a street address, a city, a state, and a zip code.

27. A method comprising:
associating a first device with a first network access point;
accessing a profile, associated with the first device, comprising a plurality of physical addresses respectively associated with a plurality of network access points, to determine a first physical address of the first device;
associating the first physical address with the first device for a packetized voice call involving the first network access point; and
engaging in the packetized voice call.

28. The method of claim 27, wherein the first device is a Voice over Internet Protocol (VoIP)-capable device.

29. The method of claim 27, further comprising determining the first physical address of the first device by performing location matching for the first device.

30. The method of claim 27, further comprising determining the first physical address of the first device by estimating the first physical address and requesting confirmation of the first physical address from a user of the first device.

* * * * *

UNITED STATES PATENT AND TRADEMARK OFFICE
CERTIFICATE OF CORRECTION

PATENT NO. : 9,055,550 B1  
APPLICATION NO. : 14/641203  
DATED : June 9, 2015  
INVENTOR(S) : Jason D. Livingood Page 1 of 1

It is certified that error appears in the above-identified patent and that said Letters Patent is hereby corrected as shown below:

On the title page, Item 22, Line 1:
        Please insert after "2015" --¶ (65) Prior Publication Data
                ¶    US 2015/0181554 A1 Jun. 25, 2015--

Signed and Sealed this  
Third Day of May, 2016

Michelle K. Lee  
*Director of the United States Patent and Trademark Office*